(12) United States Patent
Han et al.

(10) Patent No.: US 8,514,937 B2
(45) Date of Patent: Aug. 20, 2013

(54) VIDEO ENCODING APPARATUS

(75) Inventors: Jin Ho Han, Seoul (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 12/861,118

(22) Filed: Aug. 23, 2010

(65) Prior Publication Data

US 2011/0064137 A1 Mar. 17, 2011

(30) Foreign Application Priority Data

Sep. 15, 2009 (KR) .................. 10-2009-0086913

(51) Int. Cl.
*H04N 7/50* (2006.01)

(52) U.S. Cl.
USPC ............ 375/240.14; 375/240.01; 375/240.12; 375/240.17

(58) Field of Classification Search
USPC ................................................. 375/240–241
See application file for complete search history.

(56) References Cited

U.S. PATENT DOCUMENTS

| | | | | |
|---|---|---|---|---|
| 5,136,377 A | * | 8/1992 | Johnston et al. | 375/240.12 |
| 6,011,870 A | * | 1/2000 | Jeng et al. | 382/236 |
| 6,064,450 A | * | 5/2000 | Canfield et al. | 375/240.29 |
| 6,690,727 B1 | * | 2/2004 | Mehta | 375/240.12 |
| 6,842,484 B2 | * | 1/2005 | Gandhi et al. | 375/240.24 |
| 6,996,179 B2 | * | 2/2006 | Rovati et al. | 375/240.16 |
| 7,221,590 B2 | * | 5/2007 | Lee et al. | 365/185.18 |
| 7,227,896 B2 | * | 6/2007 | Sun | 375/240.16 |
| 7,272,622 B2 | * | 9/2007 | Sebot et al. | 708/200 |
| 7,424,056 B2 | * | 9/2008 | Lin et al. | 375/240.16 |
| 7,864,839 B2 | * | 1/2011 | Zhang et al. | 375/240.03 |
| 7,865,021 B2 | * | 1/2011 | Tsuboi | 382/232 |
| 7,876,830 B2 | * | 1/2011 | Katayama et al. | 375/240.16 |
| 8,023,562 B2 | * | 9/2011 | Zheludkov et al. | 375/240.16 |
| 2006/0120462 A1 | | 6/2006 | Tsuboi | |
| 2006/0209960 A1 | | 9/2006 | Katayama et al. | |
| 2008/0043831 A1 | * | 2/2008 | Sethuraman et al. | 375/240 |

FOREIGN PATENT DOCUMENTS

KR 10-1996-0033136 A 9/1996
KR 1020040033994 A 4/2004

OTHER PUBLICATIONS

Yu-Kun Lin et al., "A 242mW, 10mm$^2$ 1080p H.264/AVC High Profile Encoder Chip", The Proceedings of Design Automation Conference, 2008, pp. 78-83, ACM.

* cited by examiner

*Primary Examiner* — Christopher S Kelley
*Assistant Examiner* — Jonathan Messmore

(57) ABSTRACT

There is provided a video encoding apparatus allowing for enhanced video encoding speed according to the H.264 video coding standard. The video encoding apparatus allows the memories included in the video encoding apparatus to be shared by a plurality of elements through the rearrangement and the structural change of the memories considering an efficient hierarchical motion estimation algorithm. Therefore, the video encoding apparatus has the effects of reducing the amount of transmitted and received data between the frame memory and the video encoding apparatus and enhancing video encoding speed.

19 Claims, 12 Drawing Sheets

VIDEO ENCODING APPARATUS

CROSS-REFERENCE TO RELATED APPLICATIONS

This application claims the priority of Korean Patent Application No. 10-2009-0086913 filed on Sep. 15, 2009, in the Korean Intellectual Property Office, the disclosure of which is incorporated herein by reference.

BACKGROUND OF THE INVENTION

1. Field of the Invention

The present invention relates to an H.264 coding technology, and more particularly, to a video encoding apparatus allowing for enhanced video encoding speed according to the H.264 video coding standard.

2. Description of the Related Art

The international organizations for video coding standards, International Telecommunication Union Telecommunication Standardization Sector (ITU-T) and International Standards Organization (ISO), jointly constructed the joint video team (JVT) and presented H.264, which is a standard for video compression.

Like existing video coding standards, the H.264 standard constructs an estimation signal by a motion estimation for a previous frame that has already been encoded, constructs an estimation error signal by mixing a motion compensation with a discrete cosine transform (DCT).

In order to improve compression capability, the standard H.264 performs the motion estimation up to a 4×4 block size smaller than that used in known coding systems and the motion compensation up to a ¼ pixel unit. The H.264 video coding standard based on these technologies has twice as high a compression capability as that of a known video coding standard, the Moving Picture Experts Group-4 Advanced Simple Profile (MPEG-4 ASP).

However, video coding technology based on the H.264 standard requires wide memory bandwidth and high design complexity when realized, so that there is difficulty in creating real-time applications. Particularly, since motion estimation based on a ¼ pixel unit is more complicated than that based on a ½ pixel unit, efficient pixel interpolation and motion estimation as well as wide memory bandwidth are required.

SUMMARY OF THE INVENTION

An aspect of the present invention provides a video encoding apparatus capable of reducing the amount of transmitted and received data between a frame memory and the video encoding apparatus and enhancing video encoding speed by the rearrangement and structural change of memories included in the video encoding apparatus, with consideration to an efficient hierarchical motion estimation algorithm.

According to an aspect of the present invention, there is provided a video encoding apparatus including: a current macro block (MB) memory storing and providing previous, current and next MBs of a current frame; a search window (SW) 1 memory storing and providing search window (SW) regions of the previous, current and next MBs for coarse motion estimation; a SW2 memory storing and providing adjacent pixels around the SW regions of the previous and current MBs for fine motion estimation; a coarse motion estimation part (CME) performing coarse motion estimation on the basis of the current MB and the SW region of the current MB; a fine motion estimation and motion compensation part (FMEMC) performing fine motion estimation and motion compensation on the basis of an output of the CME, the previous MB, the SW region of the previous MB, and the adjacent pixels around the SW region of the previous MB; and an intra prediction & reconstruction part performing intra prediction, quantization, inverse quantization/inverse discrete cosine transformation/inverse hadamard, and reconstruction, by using an output of the FMEMC and information stored in the current MB memory and the SW 1 memory The video encoding apparatus may further include a frame memory storing a video frame input into the video encoding apparatus and a frame memory controller (FMC) controlling the current MB memory, the SW1 memory, and the SW2 memory to store data stored in the frame memory.

The current MB memory may include first to third banks having a storage capacity capable of storing luminance and color difference signals in the unit of MBs and separately storing luminance and color difference signals of the previous, current and next MBs, and fourth and fifth banks having a storage capacity capable of storing luminance signals in the unit of MBs and separately storing luminance signals of the previous and current MBs. Each of the first to fifth banks in the current MB memory may be divided into first to fourth memory regions separately storing four words of a block of an MB. Each of the first to fourth memory regions may be divided into an odd memory region storing first and third pixels among four pixels located on the same line and an even memory region storing second and fourth pixels thereamong.

The SW1 memory may include first to ninth banks having a storage capacity capable of storing luminance signals of three equal regions divided from an SW region of a reference frame, and separately storing luminance signals of the SW regions of the previous, current and next MBs.

Each of the first to ninth banks in the SW1 memory may be divided into first and second memory regions separately storing words located on odd lines among four words of a block of an MB. Each of the first and second memory regions may be divided into an odd memory region storing first and third pixels among four pixels located on the same line and an even memory region storing second and fourth pixels thereamong.

The SW2 memory may include first and second banks separately storing the adjacent pixels around the SW regions of the previous and current MBs.

Each of the first and second banks in the SW2 memory may be divided into first to fourth memory regions, in which the first memory region stores adjacent pixels located at upper and bottom regions of an SW region of an MB, the second memory region stores adjacent pixels located at left and right regions of the SW region of the MB, and the third and fourth memory regions separately store words located on even lines among four words of a block of the MB. Each of the third and fourth memory regions may be divided into an odd memory region storing first and third pixels among four pixels located on the same line and an even memory region storing second and fourth pixels thereamong.

The FMEMC may include a 1-pel motion estimation part (ME) calculating and outputting a 1-pel motion vector and minimum cost on the basis of an output of the CME, an MB read from the current MB memory, an SW region of the MB, and luminance signals of adjacent pixels around the SW region of the MB; a ½-pel Y interpolation part (ITP) generating a ½-pel interpolated luminance signal on the basis of the SW region of the MB and the luminance signals of the adjacent pixels around the SW region of the MB; a ½-pel Y buffer buffering the ½-pel interpolated luminance signal; a ½-pel ME calculating and outputting a ½-pel motion vector and minimum cost on the basis of an output of the 1-pel ME, the MB, and the ½-pel interpolated luminance signal; a ¼-pel ITP generating a ¼-pel interpolated luminance signal on the basis of the SW region of the MB and the ½-pel interpolated luminance signal; a ¼-pel Y buffer buffering the ¼-pel interpolated luminance signal; a ¼-pel ME calculating and outputting a ¼-pel motion vector and minimum cost on the basis of an output of the ½-pel ME, the MB, and the ¼-pel interpolated luminance signal; a ¼-pel UV ITP generating a ¼-pel interpolated color difference signal on the basis of the luminance signals of the adjacent pixels around the SW region of the MB; a ¼-pel UV buffer buffering the ¼-pel interpolated color difference signal; and a motion compensation part performing motion compensation on the basis of an output of the ¼-pel ME, the ¼-pel interpolated luminance signal, and the ¼-pel interpolated color difference signal.

The ½-pel Y buffer may include a first bank storing pixels spaced at 1 pixel intervals apart from a pixel spaced at a ½ pixel interval in upward and leftward directions of the 1-pel motion vector; a second bank storing pixels spaced at 1 pixel intervals apart from a pixel spaced at a ½ pixel interval in an upward direction of the 1-pel motion vector; and a third bank storing pixels spaced at 1 pixel intervals apart from a pixel spaced at a ½ pixel interval in a leftward direction of the 1-pel motion vector.

The ½-pel ME may use the first bank of the ½-pel Y buffer when performing a cost calculation on the basis of pixels spaced at 1 pixel intervals apart from a pixel spaced at a ½ pixel interval in the upward and leftward directions, upward and rightward directions, downward and leftward directions, or downward and rightward directions of the 1-pel motion vector. The ½-pel ME may use the second bank of the ½-pel Y buffer when performing a cost calculation on the basis of pixels spaced at 1 pixel intervals apart from a pixel spaced at a ½ pixel interval in the upward direction or downward direction of the 1-pel motion vector. The ½-pel ME may use the third bank of the ½-pel Y buffer when performing a cost calculation on the basis of pixels spaced at 1 pixel intervals apart from a pixel spaced at a ½ pixel interval in the leftward direction or rightward direction of the 1-pel motion vector.

The ¼-pel Y buffer may include a first bank storing pixels spaced at 1 pixel intervals apart from a pixel spaced at a ¼ pixel interval in upward and leftward directions of the ½-pel motion vector; a second bank storing pixels spaced at 1 pixel intervals apart from a pixel spaced at a ¼ pixel interval in an upward direction of the ½-pel motion vector; a third bank storing pixels spaced at 1 pixel intervals apart from a pixel spaced at a ¼ pixel interval in upward and rightward directions of the ½-pel motion vector; a fourth bank storing pixels spaced at 1 pixel intervals apart from a pixel spaced at a ¼ pixel interval in a leftward direction of the ½-pel motion vector; a fifth bank storing pixels spaced at 1 pixel intervals apart from a pixel spaced at a ¼ pixel interval in a rightward direction of the ½-pel motion vector; a sixth bank storing pixels spaced at 1 pixel intervals apart from a pixel spaced at a ¼ pixel interval in downward and leftward directions of the ½-pel motion vector; a seventh bank storing pixels spaced at 1 pixel intervals apart from a pixel spaced at a ¼ pixel interval in a downward direction of the ½-pel motion vector; and an eighth bank storing pixels spaced at 1 pixel intervals apart from a pixel spaced at a ¼ pixel interval in downward and rightward directions of the ½-pel motion vector.

The ¼-pel ME may use the first bank of the ¼-pel Y buffer when performing a cost calculation on the basis of pixels spaced at 1 pixel intervals apart from a pixel spaced at a ¼ pixel interval in the upward and leftward directions of the ½-pel motion vector. The ¼-pel ME may use the second bank of the ¼-pel Y buffer when performing a cost calculation on the basis of pixels spaced at 1 pixel intervals apart from a pixel spaced at a ¼ pixel interval in the upward direction of the ½-pel motion vector. The ¼-pel ME may use the third bank of the ¼-pel Y buffer when performing a cost calculation on the basis of pixels spaced at 1 pixel intervals apart from a pixel spaced at a ¼ pixel interval in the upward and rightward directions of the ½-pel motion vector. The ¼-pel ME may use the fourth bank of the ¼-pel Y buffer when performing a cost calculation on the basis of pixels spaced at 1 pixel intervals apart from a pixel spaced at a ¼ pixel interval in the leftward direction of the ½-pel motion vector. The ¼-pel ME may use the fifth bank of the ¼-pel Y buffer when performing a cost calculation on the basis of pixels spaced at 1 pixel intervals apart from a pixel spaced at a ¼ pixel interval in the rightward direction of the ½-pel motion vector. The ¼-pel ME may use the sixth bank of the ¼-pel Y buffer when performing a cost calculation on the basis of pixels spaced at 1 pixel intervals apart from a pixel spaced at a ¼ pixel interval in the downward and leftward directions of the ½-pel motion vector. The ¼-pel ME may use the seventh bank of the ¼-pel Y buffer when performing a cost calculation on the basis of pixels spaced at 1 pixel intervals apart from a pixel spaced at a ¼ pixel interval in the downward direction of the ½-pel motion vector. The ¼-pel ME may use the eighth bank of the ¼-pel Y buffer when performing a cost calculation on the basis of pixels spaced at 1 pixel intervals apart from a pixel spaced at a ¼ pixel interval in the downward and rightward directions of the ½-pel motion vector.

BRIEF DESCRIPTION OF THE DRAWINGS

The above and other aspects, features and other advantages of the present invention will be more clearly understood from the following detailed description taken in conjunction with the accompanying drawings, in which:

FIG. 9 illustrates a part of search window (SW) of a reference frame which completes ¼-pel interpolation according to an exemplary embodiment of the present invention;

FIG. 10 illustrates a bank memory map of a ½-pel Y buffer according to an exemplary embodiment of the present invention; and FIG. 11 illustrates a bank memory map of a ¼-pel Y buffer according to an exemplary embodiment of the present invention.

DETAILED DESCRIPTION OF THE PREFERRED EMBODIMENT

Figure 1:
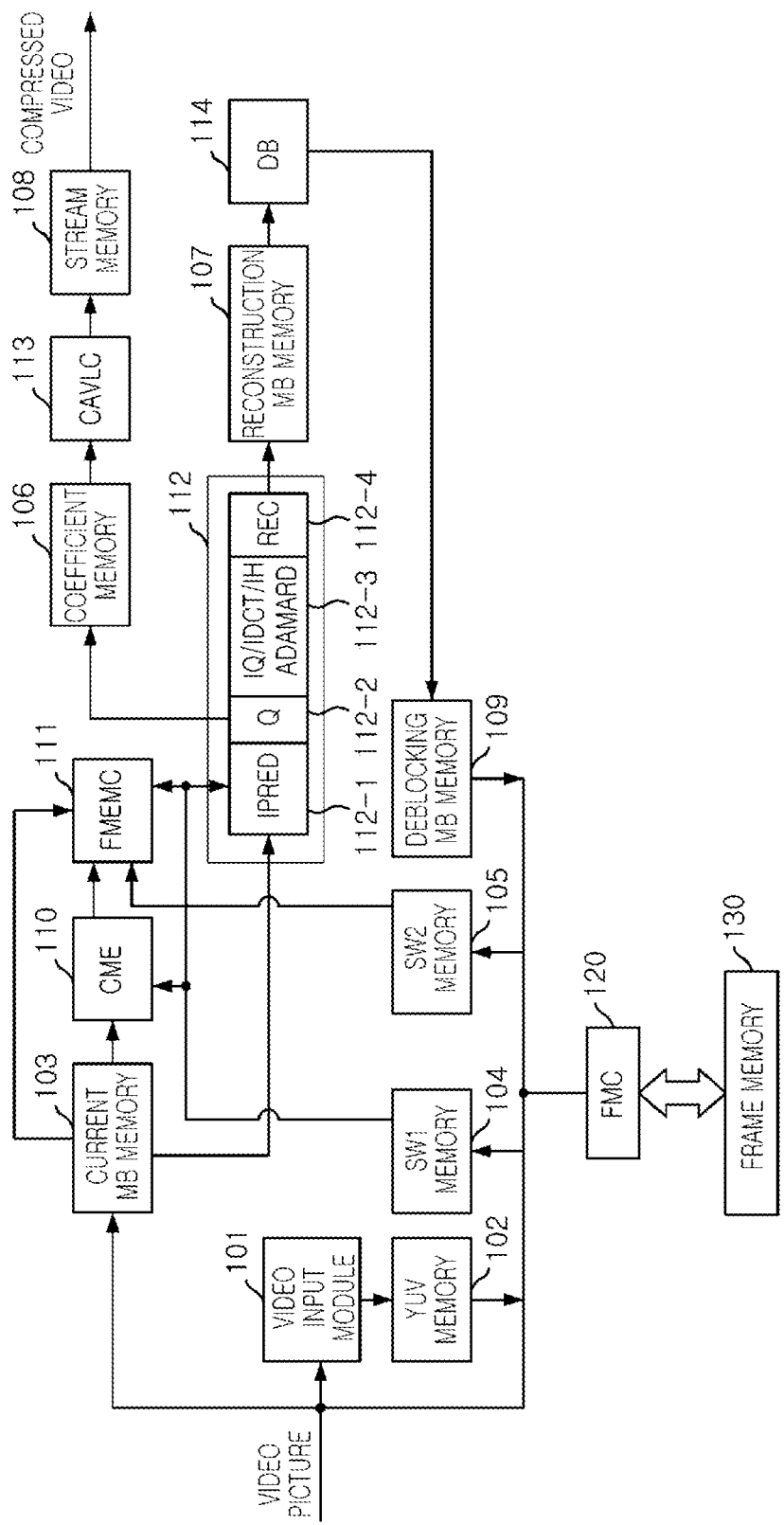
FIG. 1 illustrates a configuration of a video encoding apparatus using a video encoding technology based on the H.264 standard according to an exemplary embodiment of the present invention.

Exemplary embodiments of the present invention will now be described in detail with reference to the accompanying drawings, which will fully convey the concept of the invention to those skilled in the art. Moreover, detailed descriptions related to well-known functions or configurations will be ruled out in order not to unnecessarily obscure subject matters of the present invention.

In the drawings, elements not relevant to the descriptions will be omitted for clarity, and the same reference numerals will be used throughout to designate the same or like elements.

In addition, unless explicitly described to the contrary, the word "include" and variations such as "includes" or "including," will be understood to imply the inclusion of stated elements but not the exclusion of any other elements.

FIG. 1 illustrates a configuration of a video encoding apparatus using a video encoding technology based on the H.264 standard according to an exemplary embodiment of the present invention.

Referring to FIG. 1, a video encoding apparatus includes a video input module 101, a YUV memory 102, a current macro block (MB) memory 103, a search window 1 (SW1) memory 104, a search window 2 (SW2) memory 105, a coefficient memory 106, a reconstruction MB memory 107, a stream memory 103, a deblocking MB memory 109, a coarse motion estimation part (CME) 110, a fine motion estimation & motion compensation part (FMEMC) 111, an intra prediction & reconstruction part (IPRED_REC) 112, a context-adaptive variable length coding part (CAVLC) 113, a deblocking part (DB) 114, a frame memory controller (FMC) 120, and a frame memory 130.

Video pictures input into the video encoding apparatus are temporarily stored in the YUV memory 102 through the video input module 101, and are then stored in the frame memory 130 by the FMC 120.

The video frame stored in the frame memory 130 is read in the unit of MBs and stored in the current MB memory 103. Search window (SW) region of a reference frame for the coarse motion estimation of MBs of a current frame are stored in the SW1 memory 104. After that, the CME 110 performs coarse motion estimation.

In response to the output of the CME 110, adjacent pixels around SW regions of a reference frame for fine motion estimation are stored in the SW2 memory 105. At this time, the FMEMC 111 performs fine motion estimation and motion compensation on the basis of the output of the CME 110 and the information stored in the current MB memory 103, the SW1 memory 104, and the SW2 memory 105.

By using the output of the FMEMC 111 and the information stored in the current MB memory 103 and SW1 memory 104, the IPRED_REC 112 sequentially performs intra prediction (IPRED) 112-1, quantization (Q) 112-2, inverse quantization (IQ)/inverse discrete cosine transformation (IDCT)/inverse hadamard (IHADAMARD) 112-3, and reconstruction (REC) 112-4.

Here, the quantized result of the Q operation, is stored in the coefficient memory 106 and the reconstructed result of the REC operation is stored in the reconstruction MB memory 107.

The CAVLC 113 performs context-adaptive variable length coding on the basis of the video information stored in the coefficient memory 106, and the result thereof is stored in the stream memory 108, thereby allowing the stored content to be finally output as a compressed video.

The DB 114 performs deblocking with respect to the video information stored in the reconstruction MB memory 107, and then stores the deblocked video in the deblocking MB memory 109.

Figure 2:
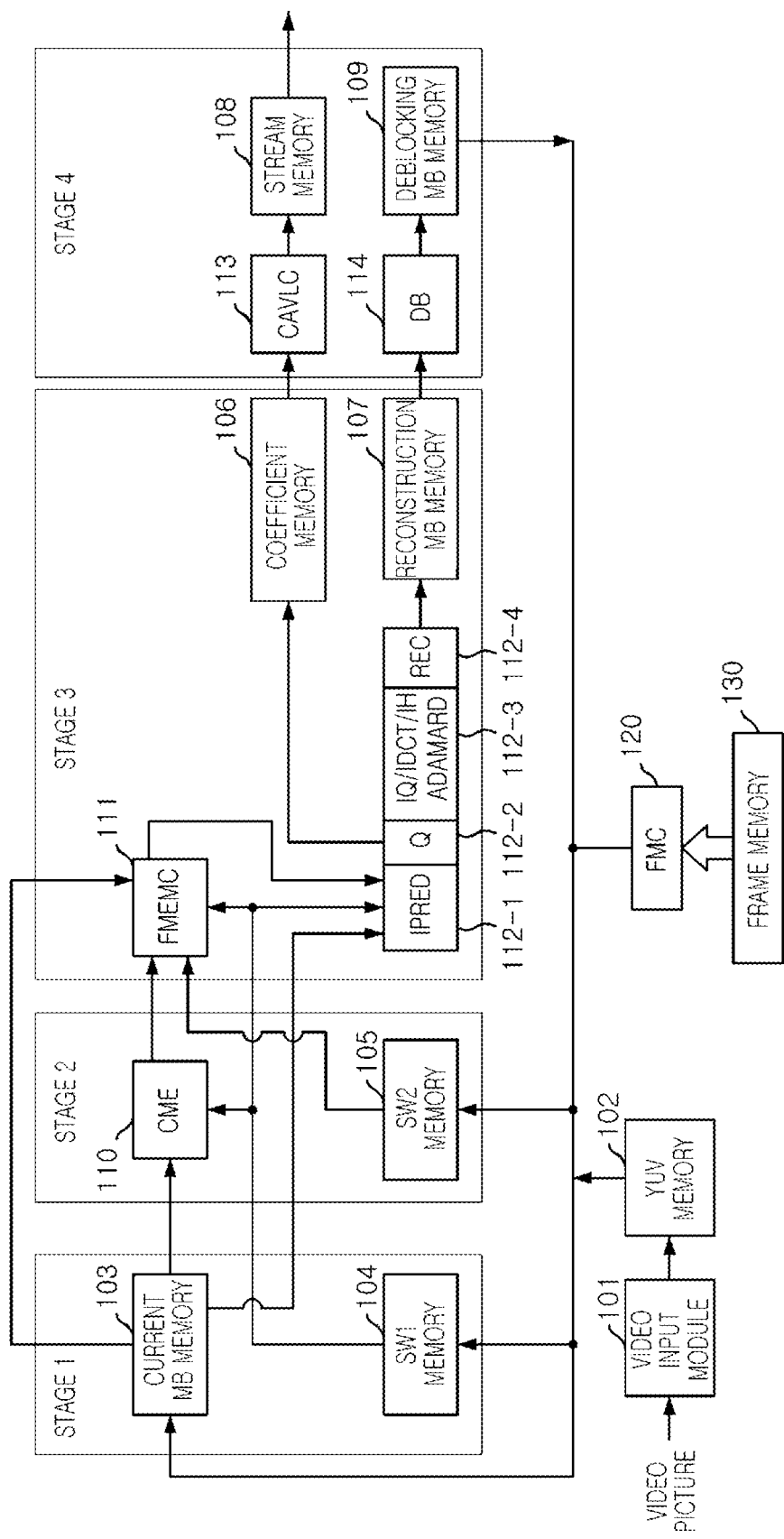
FIG. 2 illustrates the communication structure of the video encoding apparatus of FIG. 1.

A communication structure of the video encoding apparatus including the above-described configuration and operations is divided into four stages for a four-stage pipeline architecture as shown in FIG. 2.

In stage 1, the current MB memory 103 and the SW1 memory 104 read a video frame from the frame memory 130 through the FMC 120.

In stage 2, the CME 110 performs coarse motion estimation on the basis of the data stored in the current MB memory 103 and the SW 1 memory 104. Also, the SW2 memory 105 reads data required for the operation of the FMEMC 111 from the frame memory 130 through the FMC 120.

In stage 3, the FMEMC 111 and the IPRED_REC 112 performs their operations on the basis of the data stored in the current MB memory 103, the SW 1 memory 104 and the SW2 memory 105, and stores the operation results in the coefficient memory 106 and the reconstruction MB memory 107, respectively.

In stage 4, the CAVLC 113 and the DB 114 perform their operations on the basis of the data stored in the coefficient memory 106 and the reconstruction MB memory 107, and stores the operation results in the stream memory 108 and the deblocking MB memory 109, respectively.

As described above, the video encoding apparatus according to this embodiment has the four-stage pipeline architecture. However, since there is only one FMC 120 for the communication with the frame memory 130, there is limitation in the communication with many memories at the same time.

In order to minimize a problem that may be caused by such a limitation, memories may have the following structure in the present invention.

Figure 3A:
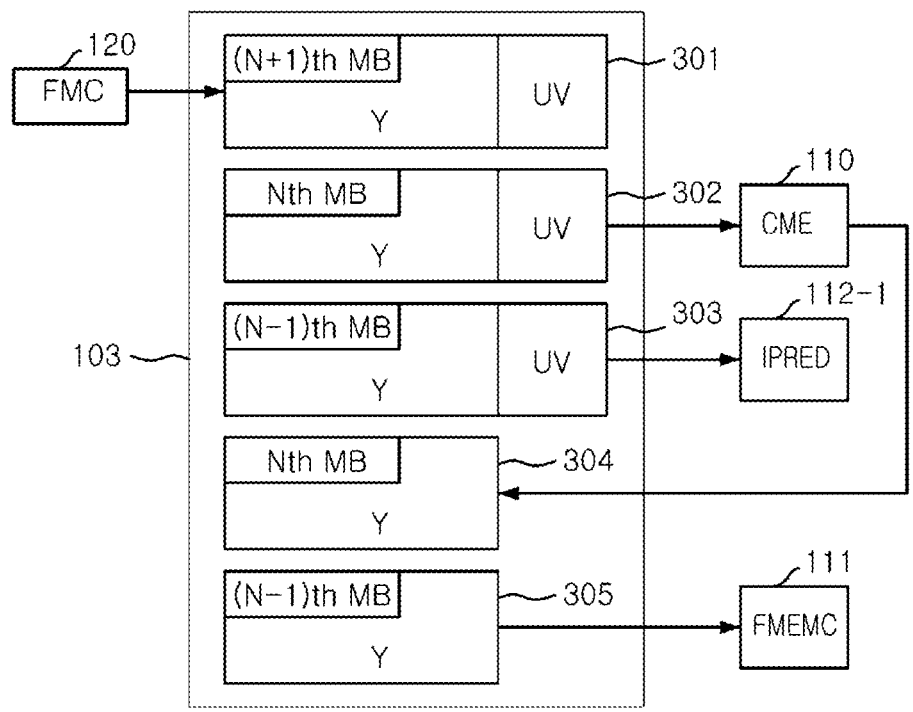
FIGS. 3A and 3B illustrate the structure of a current macro block (MB) memory according to an exemplary embodiment of the present invention.
Figure 3B:
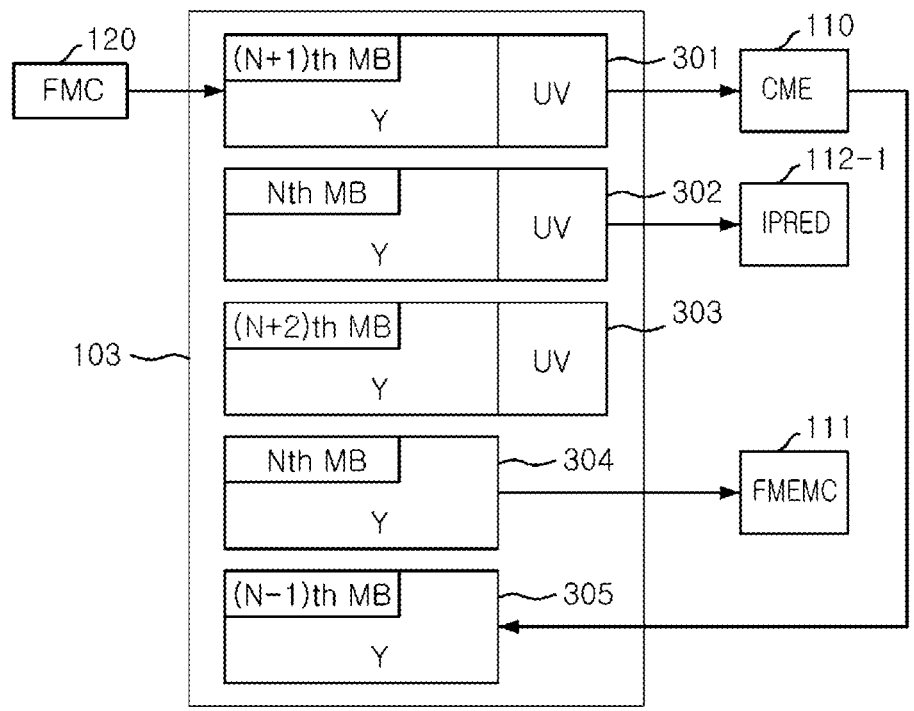

FIGS. 3A and 3B illustrate the structure of a current MB memory according to an exemplary embodiment of the present invention.

As shown in FIGS. 3A and 3B, the current MB memory 103 includes first to third banks 301 to 303 separately storing luminance and color difference signals (YUV) of previous, current, and next MBs(N−1)th MB, Nth MB, and (N+1)th MB of the current frame under control of the FMC 120, and two other banks 304 and 305 separately storing only luminance signals (Y) of the previous and current MBs (N−1)th MB and Nth MB of the current frame under control of the CME 110.

Here, each of the first to third banks 301 to 303 has a storage capacity capable of storing the YUV in the unit of MBs and each of the fourth and fifth banks 304 and 305 has a storage capacity capable of storing the Y in the unit of MBs.

Hereinafter, the operation of the current MB memory 103 will be described in detail with reference to FIGS. 3A and 3B.

As shown in FIG. 3A, during the current operation Nth, the YUV of (N+1)th MB to be next used by the CME 110, the YUV of Nth MB which is being used by the CME 110, and the YUV of (N−1)th MB which has already been used by the CME 110 are stored in the first, second and third banks 301, 302 and 303, respectively. Also, the Y of Nth MB which is being used by the CME 110 and the Y of (N−1)th MB which has already been used by the CME 110 are stored in the fourth and fifth banks 304 and 305, respectively.

The CME 110, the IPRED 112-1, and the FMEMC 111 respectively use the data stored in the second, third and fifth banks 302, 303 and 305.

If the next operation is subsequently performed, the state of the current MB memory 103 is changed as shown in FIG. 3B.

That is, when the next operation is performed, the FMC 120 initializes the third bank 303 storing the YUV of (N−1)th MB that is no longer required, and then newly stores YUV of (N+2)th MB. Also, the CME 110 also initializes the fifth bank 305 storing the Y of (N−1)th MB that is no longer required, and then newly stores Y of (N+1)th MB. That is, the FMC 120 and the CME 110 search any bank storing the data that is no longer required and store new data in that bank.

Then, the CME 110, IPRED 112-1, and the FMEMC 111 change access point to the banks and use data stored the changed access point, i.e., the first, second and fourth banks 301, 302 and 304, respectively.

In the present embodiment as described above, the FMC 120 and the CME 110 search any bank of the current MB memory 103 storing data that is no longer required per operating cycle and store new data therein. Also, the CME 110, the IPRED 112-1 and the FMEMC 111 obtain their desired data while changing their access point to the banks.

As a result, such a single current MB memory 103 is shared by a plurality of elements, i.e., the CME 110, the IPRED 112-1 and the FMEMC 111.

Figure 4A:
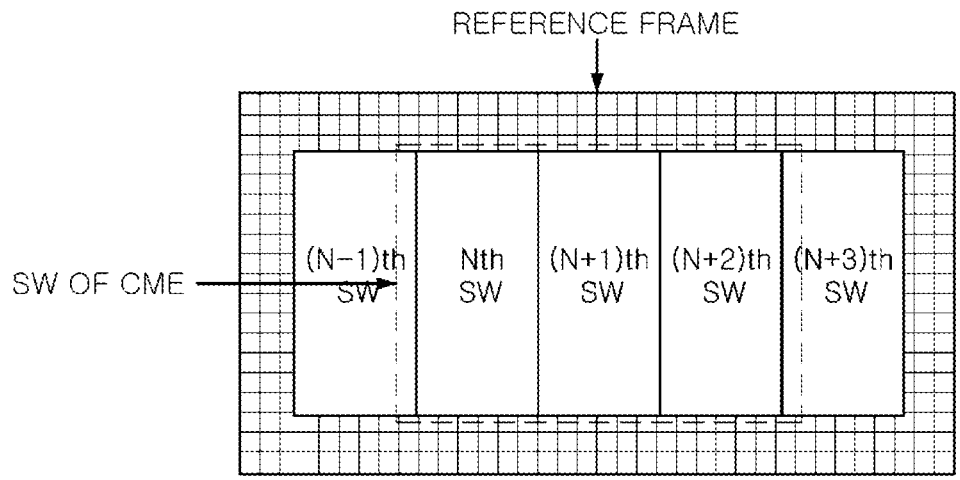
FIGS. 4A through 4D illustrate the structure of a search window 1 (SW1) memory according to an exemplary embodiment of the present invention.
Figure 4B:
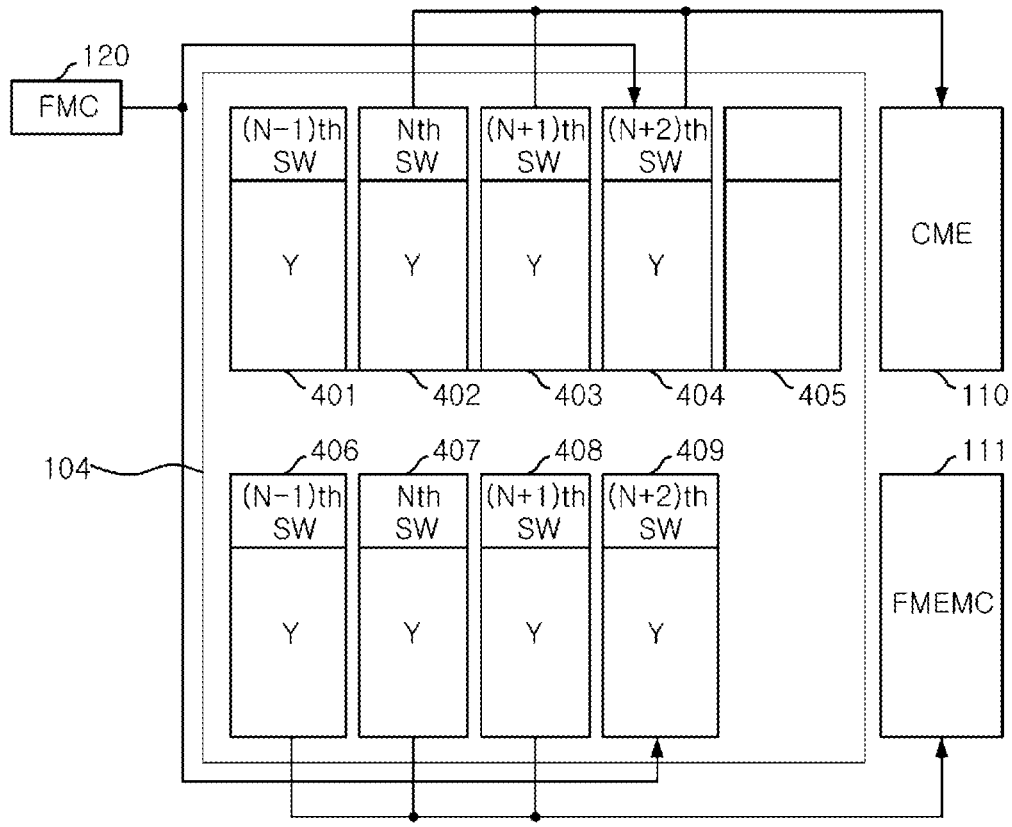
Figure 4C:
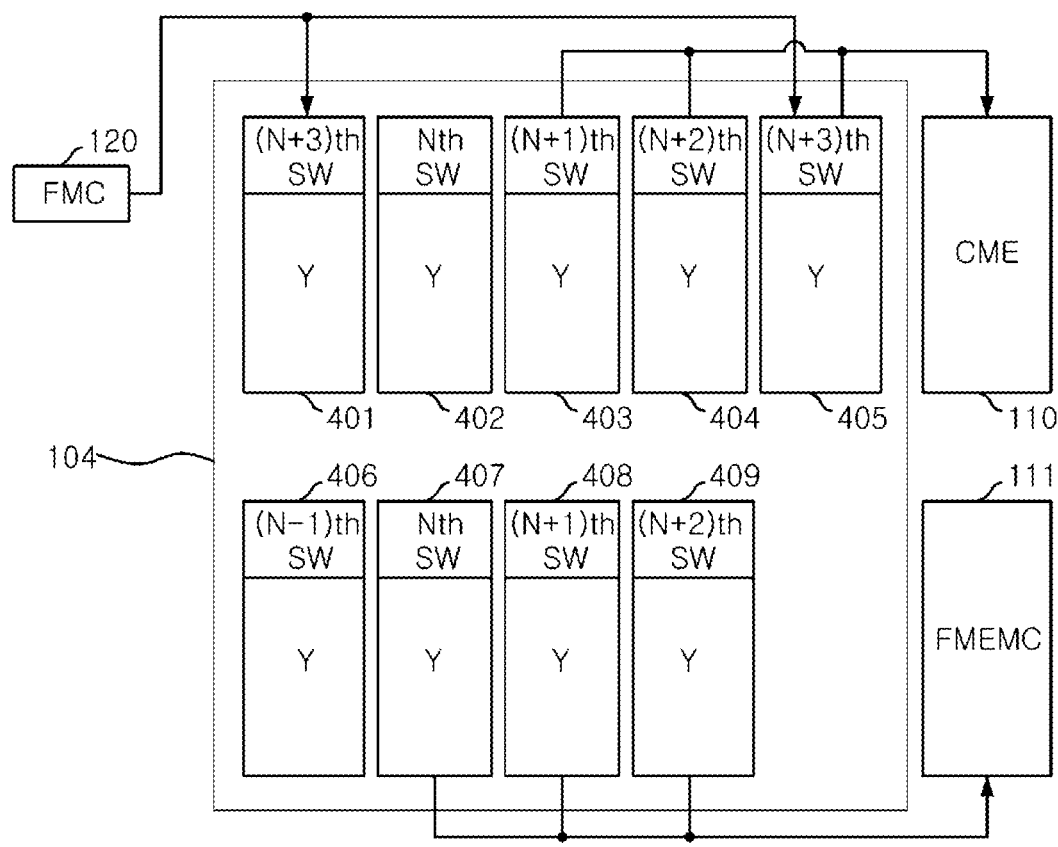
Figure 4D:
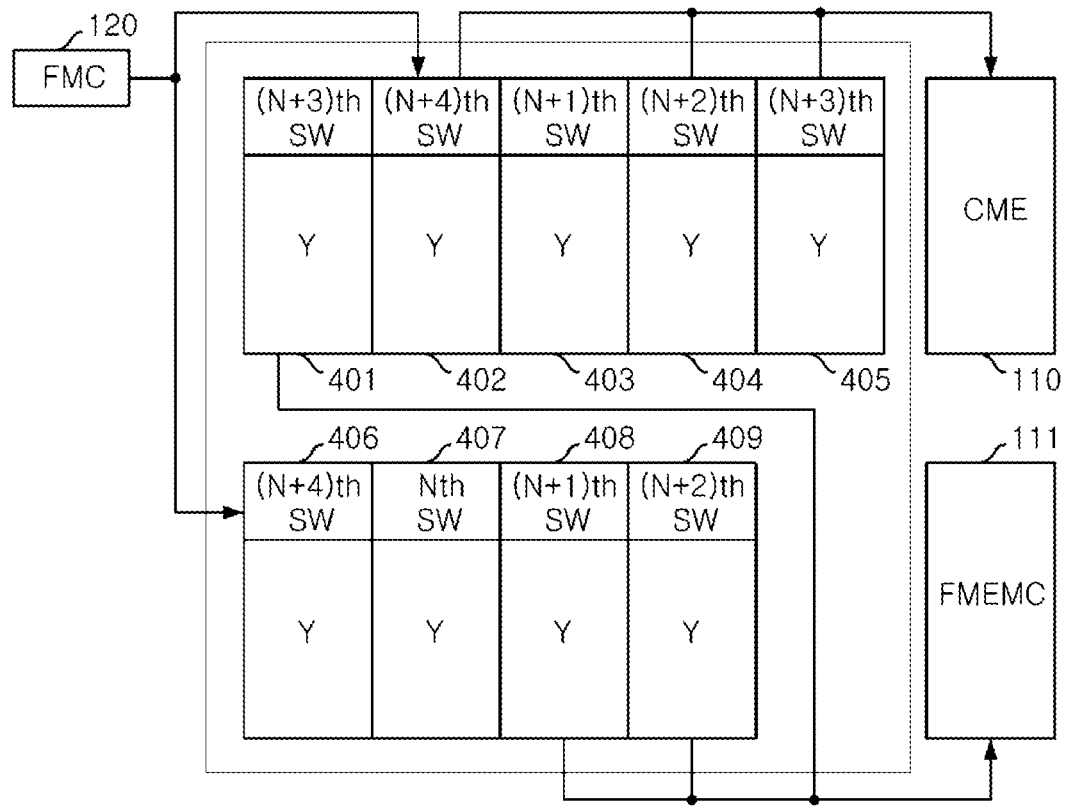

FIGS. 4A through 4D illustrate the structure of an SW1 memory according to an exemplary embodiment of the present invention. FIG. 4A illustrates SW regions of the CME 110 and FIGS. 4B through 4D illustrate the state of the SW1 memory 104 during Nth through (N+2)th operations.

Referring to FIGS. 4B through 4D, the SW1 memory 104 includes first to ninth banks 401 to 409. Each of the first to ninth banks 401 to 409 has a storage capacity capable of storing only Y of an SW region, wherein the SW region for the coarse motion estimation of a reconstruction frame used as a reference frame is equally divided by M (M: natural number), as shown in FIG. 4A.

Hereinafter, dividing the SW region into three equal regions will be described as an example for convenience of explanation.

The operation of the SW1 memory 104 will be described with reference to FIGS. 4B through 4D.

First of all, the FMC 120 reads three SWs from the reconstruction frame at the same time and separately stores them in six banks of the SW1 memory 104. In a subsequent operation, the FMC 120 reads SWs one by one and separately stores them in two banks.

That is, referring to FIG. 4B, the FMC 120 concurrently reads (N−1)th SW through (N+1)th SW in an initial operation and separately stores them in the first to third banks 401 to 403 and the sixth through eighth banks 406 through 408, and then the FMC 120 reads only (N+2)th SW and separately stores it in the fourth and ninth banks 404 and 409.

Then, the CME 110 is able to perform coarse motion estimation by using Nth SW to (N+2)th SW stored in the second to fourth banks 402 to 404. Since the FMEMC 111 requires SW regions used in the immediately previous operating cycle, it uses (N−1)th SW to (N+1)th SW stored in the sixth to eighth banks 406 to 408.

When a new operating cycle starts, as shown in FIG. 4C, the FMC 120 initializes the first bank 401 storing (N−1)th SW that is no longer required. After that, the FMC 120 reads (N+3)th SW and separately stores it in the first and fifth banks 401 and 405.

In this manner, in the next operating cycle, as shown in FIG. 4C, the FMC 120 removes the data stored in the second and sixth banks 402 and 406, and then newly stores (N+4)th SW.

In the present embodiment as described above, the FMC 120 searches the banks of the SW1 memory 104 storing data that are no longer required per operating cycle and stores new data therein. Also, the CME 110 and the FMEMC 111 obtain their desired data while changing their access to banks.

As a result, the SW1 memory 104, like the current MB memory 103, may also be shared by a plurality of elements, i.e., the CME 110 and the FMEMC 111.

Figure 5:
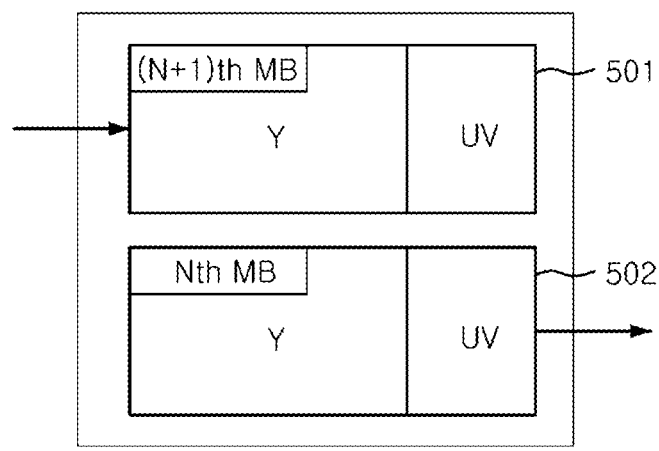
FIG. 5 illustrates the structure of a search window 2 (SW2) memory according to an exemplary embodiment of the present invention.

FIG. 5 illustrates the structure of an SW2 memory according to an exemplary embodiment of the present invention.

As shown in FIG. 5, the SW2 memory 105 includes first and second banks 501 and 502 and stores pixels around an SW region required by the FMEMC 111 in the manner of dual buffering.

That is, while the FMEMC 111 accesses and reads the bank 502, the SW2 memory 105 initializes the bank 501 storing the data that is no longer required and stores new data required for the next operation in that bank 501.

The SW region of the FMEMC 111 is not out of the SW region of the CME 110, but uses a 6 tap filtering method in performing interpolation based on a ¼ pixel unit (hereinafter, referred to as "pel") by using 1 pixel for ¼-pel motion estimation. In this case, three pixels are additionally required around the SW region of the CME 110. In the case that additional pixels are required by being influenced from the output of the CME 110, the FMC 120 reads the corresponding regions and stores those pixels in the SW2 memory 105.

Although not described above, the coefficient memory 106, the reconstruction MB memory 107, the stream memory 108, and the deblocking MB memory 109 also have a structure configured as that of the SW2 memory 105 and store data in the manner of dual buffering.

Prior to providing descriptions related to a bank structure of the current MB memory 103, the SW1 memory 104, and the SW2 memory 105 and an internal memory structure used in the CME 110 and the FMEMC 111, the configuration and operation of the CME 110 and the FMEMC 111 will first be described in order to assist in a comprehensive understanding of the invention.

Figure 6:
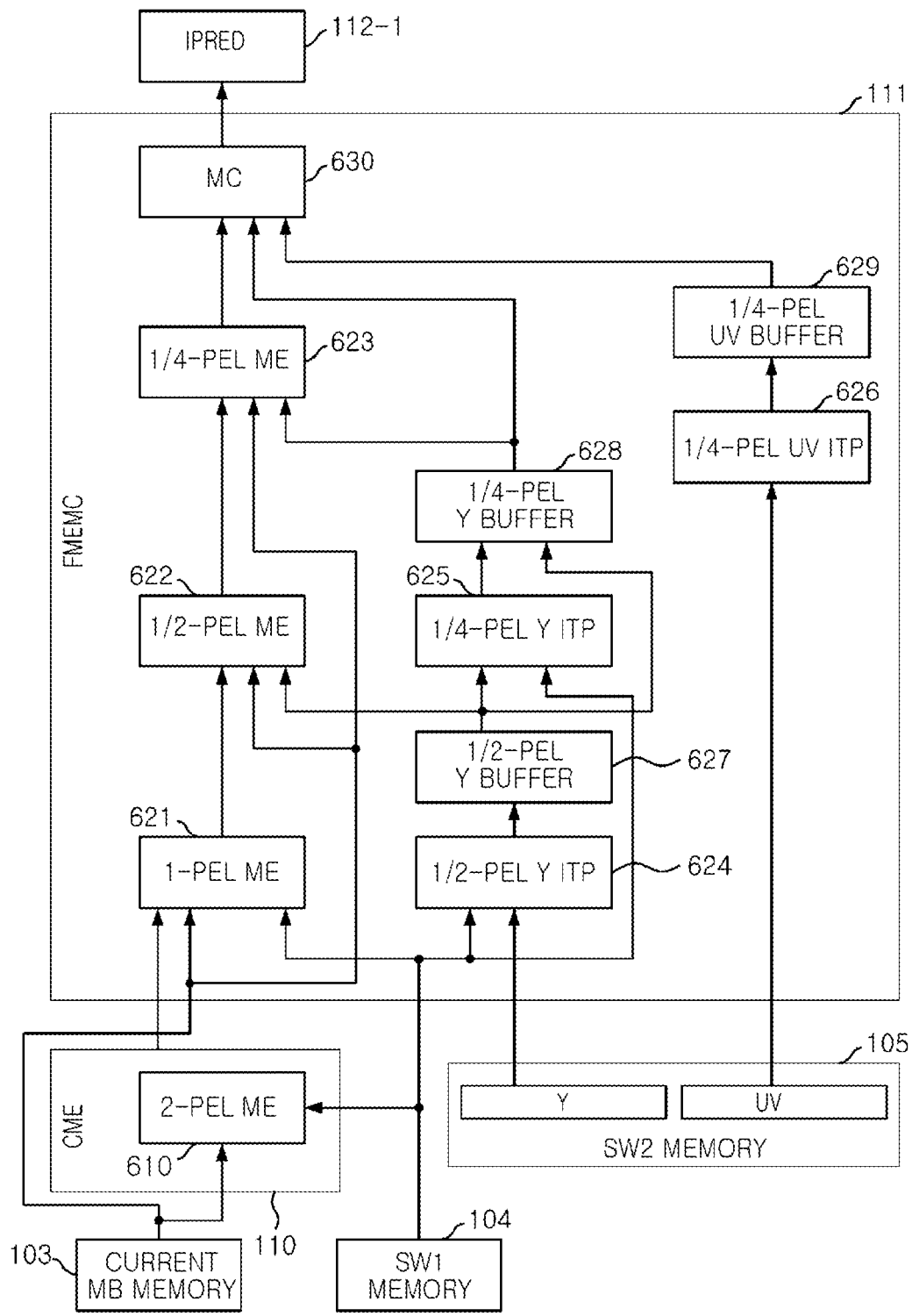
FIG. 6 illustrates a detailed configuration of a coarse motion estimation part (CME) and a fine motion estimation and motion compensation part (FMEMC) according to an exemplary embodiment of the present invention.

FIG. 6 illustrates a detailed configuration of a CME and an FMEMC according to an exemplary embodiment of the present invention.

Referring to FIG. 6, the CME 110 includes a 2-pel motion estimation part (ME) 610 and the FMEMC 111 includes a 1-pel ME 621, a ½-pel ME 622, a ¼-pel ME 623, a ½-pel Y interpolation part (ITP) 624, a ¼-pel Y ITP 625, a ¼-pel UV ITP 626, a ½-pel Y buffer 627, a ¼-pel Y buffer 628, a ¼-pel UV buffer 629, and a motion compensation part (MC) 630.

As shown in FIG. 2, in stage 1, an MB and an SW region for coarse motion estimation of the MB are stored in the current MB memory 103 and the SW1 memory 104, respectively. In stage 2, the 2-pel ME 610 of the CME 110 performs motion estimation in accordance with Equation 1 on the basis of the MB and the SW region stored in the current MB memory 103 and the SW1 memory 104, and calculates a 2-pel motion vector MV_by_2pel_ME and minimum cost Min_Cost_by_2pel_ME.

In stage 3, the 1-pel ME 621 of the FMEMC 111 calculates a 1-pel motion vector MV_by_1pel_ME and minimum cost Min_Cost_by_1pel_ME in accordance with Equation 1 on the basis of the output of the 2-pel ME 610 and an MB and an SW region for the fine motion estimation of the MB stored in the current MB memory 103 and the SW1 memory 104 (here, the data used by the FMEMC 111 is the data of the immediately previous operating cycle as compared to the data used by the CME 110). During that operation, the ½-pel ITP 624 generates a ½-pel interpolated luminance signal REF_Y_½ in accordance with Equation 2 on the basis of luminance signals stored in the SW2 memory 105, and stores it in the ½-pel Y buffer 627.

The ½-pel ME 622 calculates a ½-pel motion vector MV_by_½pel_ME and minimum cost Min_Cost_by_½pel_ME in accordance with Equation 1 on the basis of the output of the 1-pel ME 621, the SW region and the ½-pel interpolated luminance signal REF_Y_½. During that operation, the ¼-pel Y ITP 624 generates a ¼-pel interpolated luminance signal REF_Y_¼ in accordance with Equation 3 on the basis of the ½-pel interpolated luminance signal REF_Y_½ and the SW region, and stores it in the ¼-pel Y buffer 628.

The ¼-pel ME 623 calculates a 4/1-pel motion vector MV_by_¼pel_ME and minimum cost Min_Cost_by_¼pel_ME in accordance with Equation 1 on the basis of the output of the ½-pel ME 622, the SW region and the ¼-pel interpolated luminance signal REF_Y_¼. During that operation, the ¼-pel UV ITP 626 generates a ¼-pel interpolated color difference signal REF_UV_¼ in accordance with Equation 4 on the basis of the ½-pel interpolated luminance signal REF_Y_½ and the SW region, and stores it in the ¼-pel UV buffer 629.

The MC 630 provides a motion compensation result to the IPRED(112-1), by performing motion compensation on the basis of the output of the ¼-pel ME 623, the ¼-pel interpolated luminance signal REF_Y_¼, and the ¼-pel interpolated color difference signal REF_UV_¼.

$$\text{MotionVector} = (\nabla x, \nabla y) \text{MinCost}$$

$$\text{MinCost} = \text{MIN}\{\text{Cost}(\nabla x, \nabla y)\}$$

$$\text{Cost}(\nabla x, \nabla y) = \Sigma_{(x,y)=(0,0)}^{(x,y)=(15,15)} |\text{Luma}_{(x,y)}^{CurrentFrame} - \text{Luma}_{(x+\nabla x, y+\nabla y)}^{ReferenceFrame}|$$

Equation 1

Here, MotionVector, MinCost, (∇x, ∇y), Cost(∇x, ∇y), CurrentFrame, and ReferenceFrame are a motion vector, a minimum cost, a pixel location, a cost function, a current frame, and a reference frame, respectively.

$$B = \frac{E - 5F + 20G + 20H + 5I + J + 16}{32}$$

Equation 2

Here, each of E, F, G, H, I, and J is a parallel-arrayed 1-pel luminance value and b is a ½-pel luminance value between G and H.

$$a = \frac{G + b + 1}{2}$$

Equation 3

Here, a is a ¼-pel luminance value between G and b.

$$a = \frac{(4-d_x)\cdot(4-d_y)\cdot A + d_x\cdot(4-d_y)\cdot B + (4-d_x)\cdot d_y\cdot C + d_x\cdot d_y\cdot D + 16}{32}$$

Equation 4

Here, a is a location where a pixel interpolated among four adjacent pixels A, B, C, D moves as far as (dx, dy) from location A, wherein A and a are calculated by the following equations: $A=(x_a, y_a)$, and $a=(x_a+d_x, y_a+d_y)$.

Figure 7:
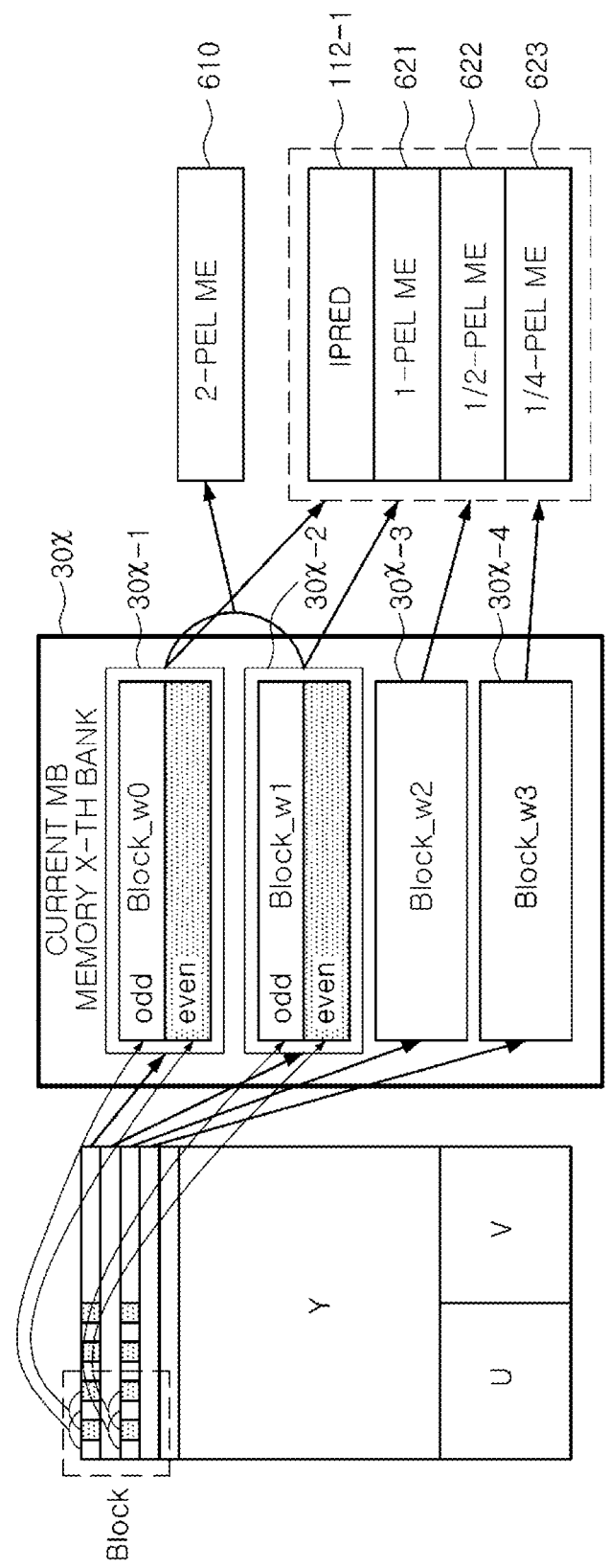
FIG. 7 illustrates a bank structure of a current MB memory according to an exemplary embodiment of the present invention.

FIG. 7 illustrates a bank structure of a current MB memory according to an exemplary embodiment of the present invention.

Referring to FIG. 7, a single bank 30x in the current MB memory 103 is divided into four memory regions 30x-1 to 30x-4 that separately store four words Block_w0 to Block_w3 included in a single block of the MBs of the current frame, respectively.

Here, the first and second memory regions 30x-1 and 30x-2 store the words Block_w0 and Block_w2 located on odd lines, while the third and fourth memory regions 30x-3 and 30x-4 store the words Block_w1 and Block_w3 located on even lines.

Each of the four memory regions in the single bank 30x has an independent output port, and accordingly, each memory region is allowed to read a single word per single access, resulting in the reading of one entire block. That is, the elements carrying out data processing in the unit of blocks are allowed to read a single block and process data therein at the same time.

The 2-pel ME 610 of the CME 110 performs motion estimation with respect to a matrix of 8×8 pixels obtained by ½ sampling, rather than a matrix of 16×16 pixels corresponding to a size of MB in the related art.

In order to support the operation of the 2-pel ME 610, the pixels read from the frame memory 130 are divided into effective pixels and ineffective pixels and are stored in physically different memory regions accordingly. That is, among four pixels located on the same line of the same block, the first and third pixels are stored in odd memory regions and the second and fourth pixels are stored in even memory regions.

When using the current MB memory 103, the 2-pel ME 610 uses only the even memory regions of the first and second memory regions 30x-1 and 30x-2. When reading data in the unit of words, the 2-pel ME 610 obtains four effective pixels including pixels of neighboring blocks of the same line stored in the first and second memory regions 30x-1 and 30x-2.

In order to read data in the unit of words when the IPRED 112-1, the 1-pel ME 621, the ½-pel ME 622 and the ¼-pel ME 623 use the first and second memory regions 30x-1 and 30x-2, the odd and even memory regions are read in the unit of half-words.

Figure 8:
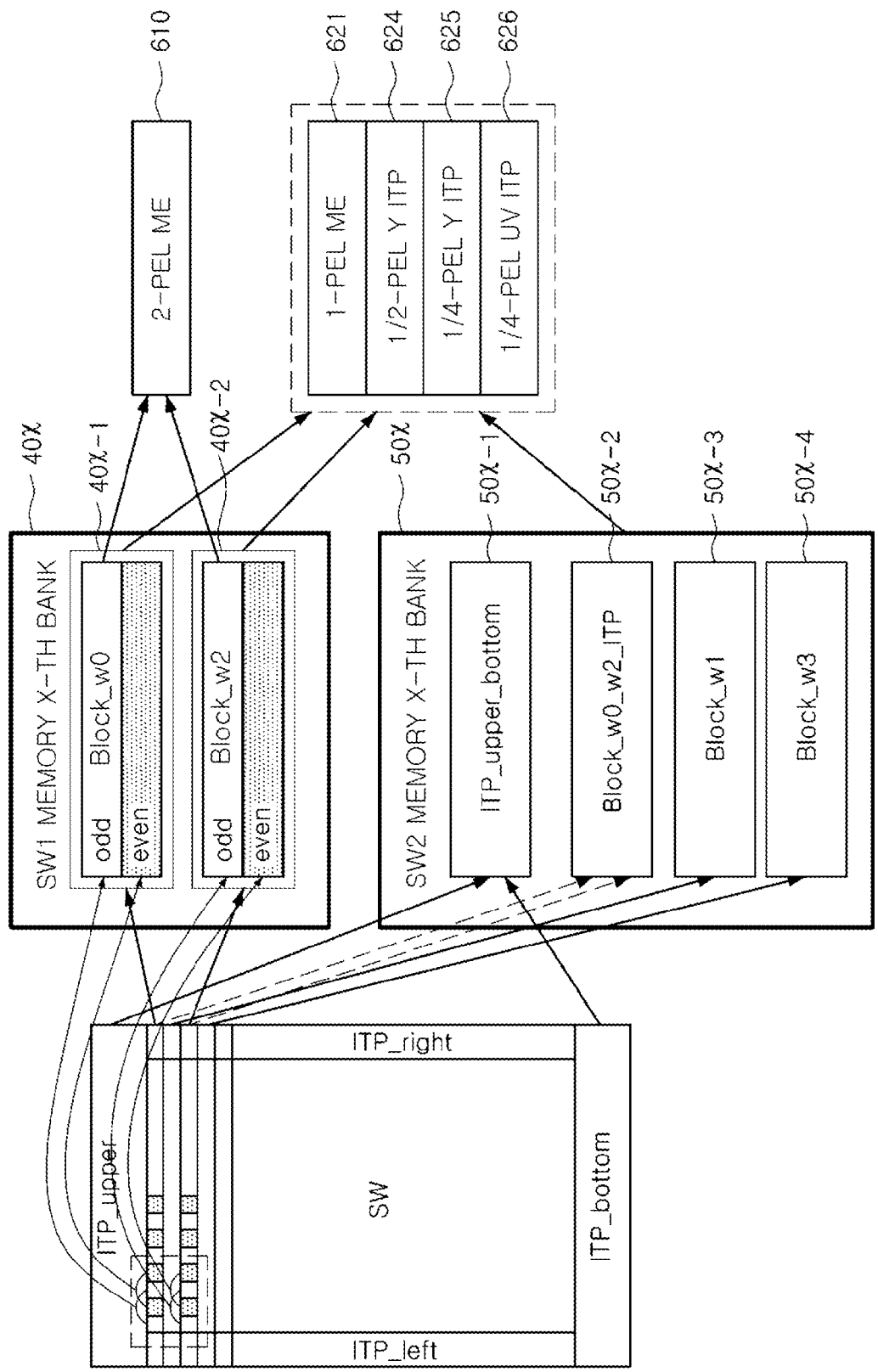
FIG. 8 illustrates a bank structure of an SW1 memory and an SW2 memory according to an exemplary embodiment of the present invention.

FIG. 8 illustrates the bank structure of an SW1 memory and an SW2 memory according to an exemplary embodiment of the present invention.

Referring to FIG. 8, a single bank 40x in the SW1 memory is divided into two memory regions 40x-1 and 40x-2 and a single bank 50x in the SW2 memory is divided into four memory regions 50x-1 to 50x-4.

As describe above, since the 2-pel ME 610 performs motion estimation with respect to a matrix of 8×8 pixels obtained by ½ sampling contrary to the related art, data in an SW region of the reference frame are read in the same manner as that of the current MB memory 103.

When dividing the SW region in the unit of blocks, the bank 40x of the SW1 memory 104 separately stores the words Block_w0 and Block_w2 located on odd lines among the four words in the two memory regions 40x-1 and 40x-2. The first and third pixels of those words Block_w0 and Block_w2 are stored in odd memory regions and the second and fourth pixels thereof are stored in even memory regions.

The 2-pel ME 610 is allowed to read only the odd memory regions, while the 1-pel ME 621, the ½-pel Y ITP 624, the ¼-pel Y ITP 625 and the ¼-pel UV ITP 626 are allowed to read the even memory regions as well as the odd memory regions.

The SW2 memory 105 reads the words Block_w1 and Block_w3, located in even lines among the four words of the block required according to a result of the operation of the CME 110, and pixels located in the left and right regions of the even lines, and stores them in the third and fourth memory regions 50x-3 and 50x-4.

For motion interpolation, upper, bottom, left and right regions including three pixels besides the SW region are further required. Those regions may be already stored in the third and fourth memory regions 50x-3 and 50x-4. Otherwise, the SW2 memory 105 stores the pixels ITP_upper_bottom of the upper and bottom regions in the first memory region 50x-1 and pixels Block_wo_w2_ITP of the left and right regions of the odd lines in the second memory region 50x-2.

Figure 9:
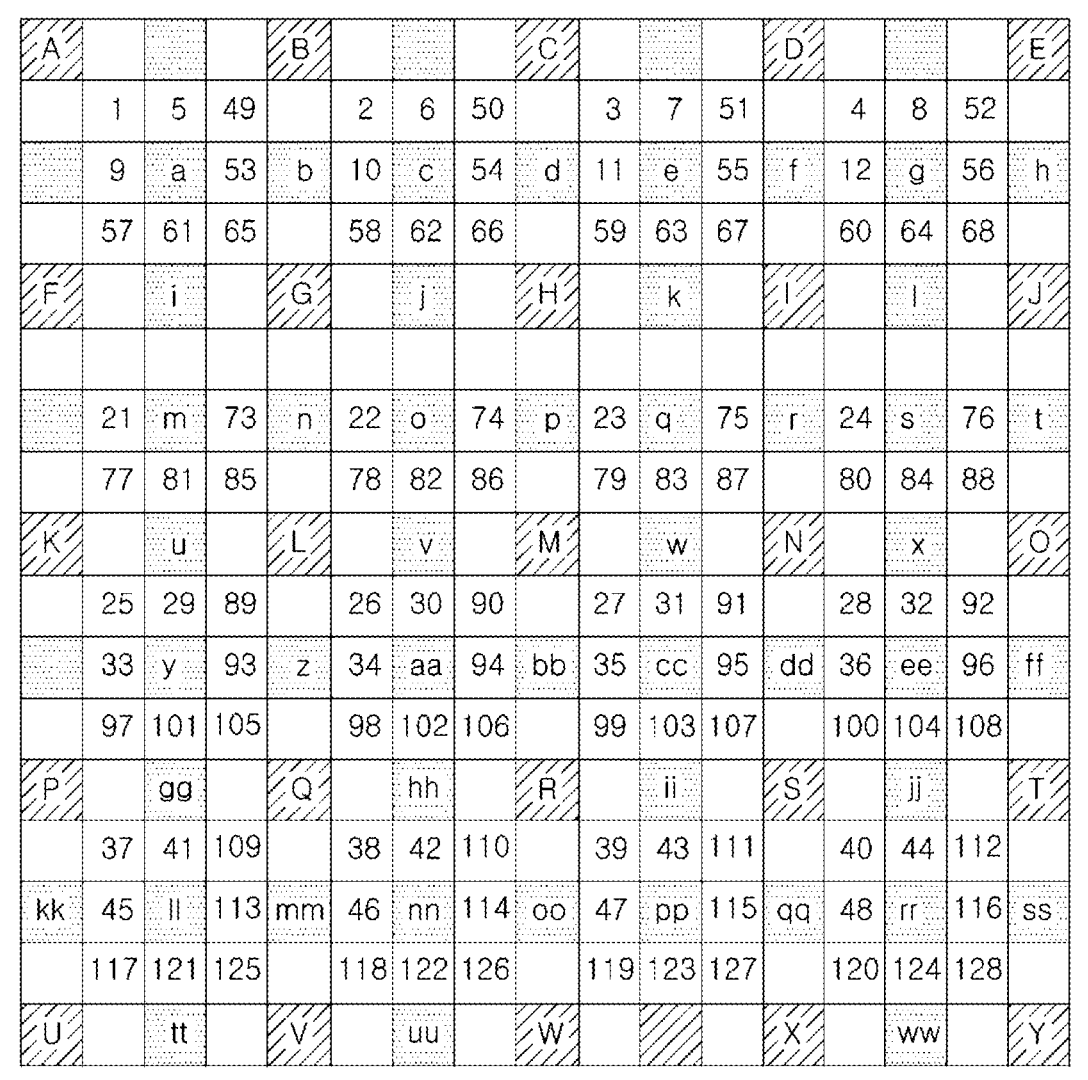

FIG. 9 illustrates a part of an SW of a reference frame which completes ¼-pel interpolation according to an exemplary embodiment of the present invention.

In FIG. 9, capital letters, small letters, and numerals represent 1-pel values, ½-pel values, and ¼-pel values, respectively. This notation system is applied to FIGS. 10 and 11 in the same manner.

On the SW, the 1-pel values are disposed to have a 1-pixel interval therebetween. The ½-pel values are disposed to have a ½-pixel interval therebetween with respect to the 1-pel values. The ¼-pel values are disposed to have a ¼-pixel interval therebetween with respect to the ½-pel values.

If a 1-pel motion vector MV_by_1pel_ME, output from the 1-pel ME 621, is G, the ½-pel ME 622 performs a cost calculation a total of eight times by reading 16×16 pixels in such a manner that 16 pixels in the rightward direction and 16 pixels in the downward direction from values of a, b, c, i, j, m, n and o except G are read at 1 pixel intervals.

When the ½-pel ME 622 starts its calculation from a, values are a, c, e, g, . . . in a horizontal direction and a, m, y, ll, . . . in a vertical direction.

Figure 10:
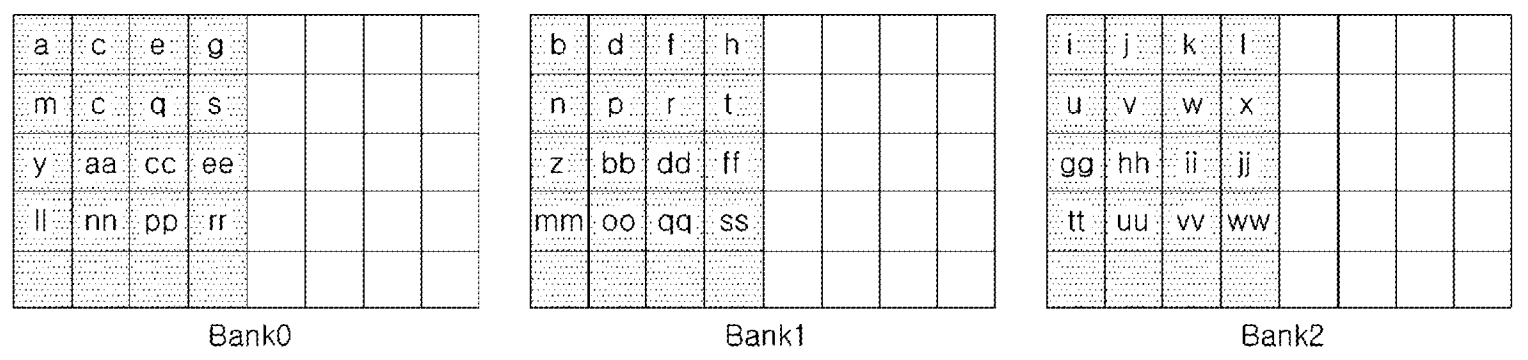

In order to independently perform eight cost calculations, a memory including three banks having memory maps as shown in FIG. 10 may constitute the ½-pel Y buffer 627.

Referring to FIG. 10, Bank0 stores pixels spaced at 1 pixel intervals apart from the pixel (namely, a) spaced at a ½ pixel interval in the upward and leftward directions of G which is the 1-pel motion vector, and this bank is used for a cost calculation starting from a, c, m, or o.

Bank1 stores pixels spaced at 1 pixel intervals apart from the pixel (namely, b) spaced at a ½ pixel interval in the upward direction of G, and this bank is used for a cost calculation starting from b or n.

Bank2 stores pixels spaced at 1 pixel intervals apart from the pixel (namely, i) spaced at a ½ pixel interval in the upward direction of G, and this bank is used for a cost calculation starting from i or j.

Since each of Bank0 to Bank2 in the ½-pel Y buffer 627 has a physically separated port, it is possible to read the banks at the same time.

If a ½-pel motion vector MV_by_½pel ME, output from the ½-pel ME 622, is a, pixels required by the ¼-pel ME 623 using the ¼-pel Y buffer 628 are stored at ¼ pixel intervals on the basis of a.

The ¼-pel ME 623 performs a cost calculation a total of eight times by reading 16×16 pixels in such a manner that 16 pixels in the rightward direction and 16 pixels in the downward direction from values of 1, 5, 49, 9, 53, 57, 61 and 65 except a are read at 1 pixel intervals. When the ¼-pel ME 623 starts its calculation from 1, values are 1, 2, 3, 4, in a horizontal direction and 1, 13, 25, 37, in a vertical direction.

Figure 11:
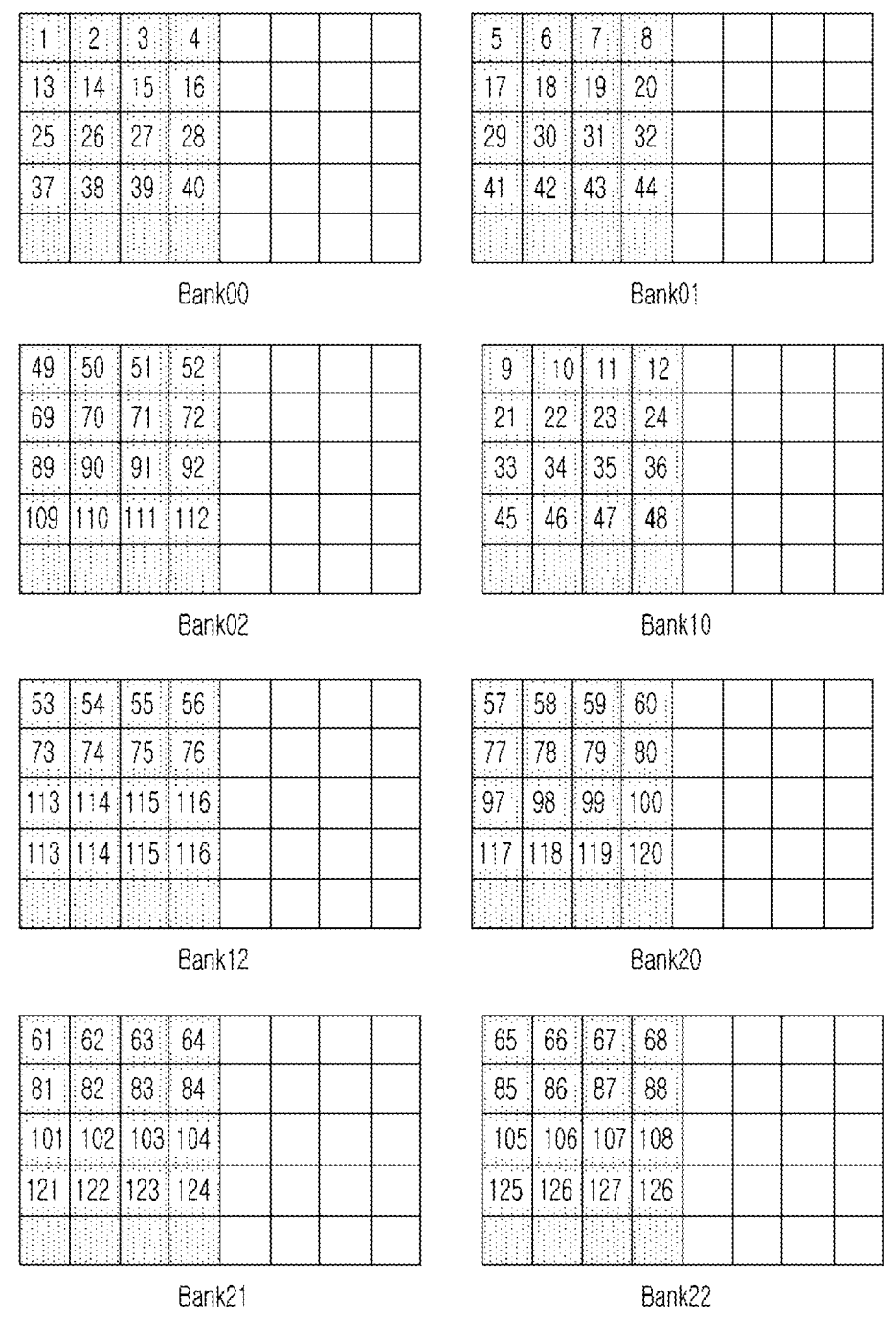

In order to independently perform eight cost calculations, a memory including eight banks having memory maps as shown in FIG. 11 may constitute the ¼-pel Y buffer 628.

Bank00 stores pixels spaced at 1 pixel intervals apart from the pixel (namely, 1) spaced at a ½ pixel interval in the upward and leftward directions of a which is the ½-pel motion vector, and this bank is used for a cost calculation starting from 1.

Bank01 stores pixels spaced at 1 pixel intervals apart from the pixel (namely, 5) spaced at a ½ pixel interval in the upward direction of a, and this bank is used for a cost calculation starting from 5.

Bank02 stores pixels spaced at 1 pixel intervals apart from the pixel (namely, 49) spaced at a ½ pixel interval in the upward and rightward directions of a, and this bank is used for a cost calculation starting from 49.

Bank10 stores pixels spaced at 1 pixel intervals apart from the pixel (namely, 9) spaced at a ½ pixel interval in the leftward direction of a, and this bank is used for a cost calculation starting from 9.

Bank12 stores pixels spaced at 1 pixel intervals apart from the pixel (namely, 53) spaced at a ½ pixel interval in the rightward direction of a, and this bank is used for a cost calculation starting from 53.

Bank20 stores pixels spaced at 1 pixel intervals apart from the pixel (namely, 57) spaced at a ½ pixel interval in the downward and leftward directions of a, and this bank is used for a cost calculation starting from 57.

Bank21 stores pixels spaced at 1 pixel intervals apart from the pixel (namely, 61) spaced at a ½ pixel interval in the downward and leftward directions of a, and this bank is used for a cost calculation starting from 61.

Bank22 stores pixels spaced at 1 pixel intervals apart from the pixel (namely, 65) spaced at a ½ pixel interval in the downward and rightward directions of a, and this bank is used for a cost calculation starting from 65.

Since each of Bank00 to Bank22 in the ¼-pel Y buffer 628 has a physically separated port, it is possible to read the banks at the same time.

The video encoding apparatus with the above-described configuration and operations is allowed to have a relatively improved operating speed relative to that of the related art as shown in the Table below. Here, this Table shows a comparison result of the number of clocks required for data processing in the unit of MBs in the case that the video encoding apparatus has the pipeline architecture as shown in FIG. 2.

Generally, a major factor in determining pipeline stages is the time consumed in storing or removing required information in a memory before each stage by the FMC 120. The number of clocks required for data processing in the unit of MBs can be those consumed to fill up the memory by the FMC 120 per each stage.

Here, the memory filled up and emptied by the FMC 120 includes the current MB memory 103, the SW1 memory 104, the SW2 memory 105, and the deblocking MB memory 109.

If the video encoding apparatus does not have such proposed architecture, the CME 110, the IPRED 112-1 and the FMEMC 111 are present at different stages, so they requires different current MBs. Also, effective pixels of the current MB, required by the IPRED 112-1 and the FMEMC 111 which are present at the same stage, also become different.

Accordingly, the current MB memory 103 is used by the CME 110, the IPRED 112-1 and the FMEMC 111, respectively, and needs to repeatedly read the current MBs required by each of them from the frame memory 130 through the FMC 120.

Also, since the information of the SW2 memory 105 are filled without referring to the information of the SW1 memory, all YUV in a search range of the FMEMC 111 need to be stored.

In addition, the frame memory 130 is usually realized as SDRAM. In order to support a video size of 720p or 1080p, column address strobe (CAS) latency 3 and tRAC 7 (time until activation of row address strobe (RAS) after activation of CAS) may be set as a parameter. Here, since tRAC is not dominant in the measurement of a Read/Write cycle, only the CAS latency 3 was used to compare performances. The effect of the invention is shown below.

| Memory Type | Related Art | Present Invention |
| --- | --- | --- |
| Current MB memory | 360 | 192 |
| SW1 memory | 168 | 168 |
| SW2 memory | 264 | 68.6 |
| Deblocked MB memory | 192.3 | 192.3 |
| Throughput (Cycle/MB) | 984.3 | 720.9 |

According to the above Table, a throughput of 984 cycles in the related art is reduced by up to 721 cycles in the present invention. It is understood that the video encoding speed of the present invention is improved by approximately 26.76%, as compared to that of the related art.

As set forth above, according to exemplary embodiments of the invention, the video encoding apparatus allows the memories included in the video encoding apparatus to be shared by a plurality of elements through the rearrangement and the structural change of the memories considering an efficient hierarchical motion estimation algorithm.

Therefore, the video encoding apparatus has the effects of reducing the amount of transmitted and received data between the frame memory and the video encoding apparatus and enhancing video encoding speed.

While the present invention has been shown and described in connection with the exemplary embodiments, it will be apparent to those skilled in the art that modifications and variations can be made without departing from the spirit and scope of the invention as defined by the appended claims.

What is claimed is:

1. A video encoding apparatus comprising:
a current macro block (MB) memory storing and providing previous, current and next MBs of a current frame;
a search window one (SW1) memory storing and providing search window (SW) regions of the previous, current and next MBs for coarse motion estimation;
a search window two (SW2) memory storing and providing adjacent pixels around the SW regions of the previous and current MBs for fine motion estimation;
a coarse motion estimation part (CME) performing coarse motion estimation on the basis of the current MB and the SW region of the current MB;
a fine motion estimation and motion compensation part (FMEMC) performing fine motion estimation and motion compensation on the basis of an output of the CME, the previous MB, the SW region of the previous MB, and the adjacent pixels around the SW region of the previous MB; and
an intra prediction & reconstruction part performing intra prediction, quantization, inverse quantization/inverse discrete cosine transformation/inverse hadamard, and reconstruction, by using an output of the FMEMC and information stored in the current MB memory and the SW-1 memory wherein the FMEMC includes:
a 1-pel motion estimation part (ME) calculating and outputting a 1-pel motion vector and minimum cost on the basis of an output of the CME, an MB read from the current MB memory, an SW region of the MB, and luminance signals of adjacent pixels around the SW region of the MB;
a ½-pel Y interpolation part (ITP) generating a ½-pel interpolated luminance signal on the basis of the SW region of the MB and the luminance signals of the adjacent pixels around the SW region of the MB;
a ½-pel Y buffer buffering the ½-pel interpolated luminance signal;
a ½-pel ME calculating and outputting a ½-pel motion vector and minimum cost on the basis of an output of the 1-pel ME, the MB, and the ½-pel interpolated luminance signal;
a ¼-pel ITP generating a ¼-pel interpolated luminance signal on the basis of the SW region of the MB and the ½-pel interpolated luminance signal;
a ¼-pel Y buffer buffering the ¼-pel interpolated luminance signal;
a ¼-pel ME calculating and outputting a ¼-pel motion vector and minimum cost on the basis of an output of the ½-pel ME, the MB, and the ¼-pel interpolated luminance signal;
a ¼-pel UV ITP generating a ¼-pel interpolated color difference signal on the basis of the luminance signals of the adjacent pixels around the SW region of the MB;
a ¼-pel UV buffer buffering the ¼-pel interpolated color difference signal; and
a motion compensation part performing motion compensation on the basis of an output of the ¼-pel ME, the ¼-pel interpolated luminance signal, and the ¼-pel interpolated color difference signal.

2. The video encoding apparatus of claim 1, further comprising:
a frame memory storing a video frame input into the video encoding apparatus; and
a frame memory controller (FMC) controlling the current MB memory, the SW1 memory, and the SW2 memory to store data stored in the frame memory.

3. The video encoding apparatus of claim 2, wherein the current MB memory comprises:
first to third banks having a storage capacity capable of storing luminance and color difference signals in the unit of MBs and separately storing luminance and color difference signals of the previous, current and next MBs; and
fourth and fifth banks having a storage capacity capable of storing luminance signals in the unit of MBs and separately storing luminance signals of the previous and current MBs.

4. The video encoding apparatus of claim 3, wherein, whenever a new operating cycle starts, the FMC initializes one of the first to third banks which stores luminance and color difference signals of an MB that is no longer required, and then stores luminance and color difference signals of a new MB in the initialized banks.

5. The video encoding apparatus of claim 3, wherein, whenever a new operating cycle starts, the CME initializes one of the fourth and fifth banks which stores luminance signals of an MB that is no longer required, and then stores luminance signals of a new MB.

6. The video encoding apparatus of claim 3, wherein each of the first to fifth banks in the current MB memory is divided into first to fourth memory regions separately storing four words of a block of an MB,
  wherein each of the first to fourth memory regions is divided into an odd memory region and an even memory region, the odd memory region storing first and third pixels among four pixels located on the same line and the even memory region storing second and fourth pixels thereamong.

7. The video encoding apparatus of claim 2, wherein the SW1 memory comprises first to ninth banks having a storage capacity capable of storing luminance signals of three equal regions divided from an SW region of a reference frame, and separately storing luminance signals of the SW regions of the previous, current and next MBs.

8. The video encoding apparatus of claim 7, wherein, whenever a new operating cycle starts, the FMC initializes one of the first to ninth banks which stores luminance signals of an SW region that is no longer required, and then stores luminance signals of a new SW region.

9. The video encoding apparatus of claim 7, wherein each of the first to ninth banks in the SW1 memory is divided into first and second memory regions separately storing words located on odd lines among four words of a block of an MB,
  wherein each of the first and second memory regions is divided into an odd memory region and an even memory region, the odd memory region storing first and third pixels among four pixels located on the same line and the even memory region storing second and fourth pixels thereamong.

10. The video encoding apparatus of claim 2, wherein the SW2 memory comprises first and second banks separately storing the adjacent pixels around the SW regions of the previous and current MBs.

11. The video encoding apparatus of claim 10, wherein each of the first and second banks in the SW2 memory is divided into first to fourth memory regions, the first memory region storing adjacent pixels located at upper and bottom regions of an SW region of an MB, the second memory region storing adjacent pixels located at left and right regions of the SW region of the MB, and the third and fourth memory regions separately storing words located on even lines among four words of a block of the MB,
  wherein each of the third and fourth memory regions is divided into an odd memory region and an even memory region, the odd memory region storing first and third pixels among four pixels located on the same line and the even memory region storing second and fourth pixels thereamong.

12. The video encoding apparatus of claim 10, wherein, whenever a new operating cycle starts, the FMC initializes one of the first and second banks which stores adjacent pixels that are no longer required, and then stores new adjacent pixels.

13. The video encoding apparatus of claim 2, further comprising:
  a coefficient memory storing a result of quantization provided by the intra prediction & reconstruction part;
  a reconstruction MB memory storing a result of reconstruction provided by the intra prediction & reconstruction part;
  a context-adaptive variable length coding part (CAVLC) performing context-adaptive variable length coding on the basis of a video picture stored in the coefficient memory;
  a stream memory storing a result of the context-adaptive variable length coding provided by the CAVLC and outputting a compressed video;
  a deblocking part (DB) performing deblocking with respect to a video picture stored in the reconstructed MB memory; and
  a deblocking MB memory storing a result of the deblocking provided by the DB.

14. The video encoding apparatus of claim 1, wherein the CME performs motion estimation with respect to a matrix of 8×8 pixels obtained by ½ sampling in the unit of MBs.

15. The video encoding apparatus of claim 1, wherein the ½-pel Y buffer comprises:
  a first bank storing pixels spaced at 1 pixel intervals apart from a pixel spaced at a ½ pixel interval in upward and leftward directions of the 1-pel motion vector;
  a second bank storing pixels spaced at 1 pixel intervals apart from a pixel spaced at a ½ pixel interval in an upward direction of the 1-pel motion vector; and
  a third bank storing pixels spaced at 1 pixel intervals apart from a pixel spaced at a ½ pixel interval in a leftward direction of the 1-pel motion vector.

16. The video encoding apparatus of claim 15, wherein the ½-pel ME uses the first bank of the ½-pel Y buffer when performing a cost calculation on the basis of pixels spaced at 1 pixel intervals apart from a pixel spaced at a ½ pel interval in the upward and leftward directions, upward and rightward directions, downward and leftward directions, or downward and rightward directions of the 1-pel motion vector,
  the ½-pel ME uses the second bank of the ½-pel Y buffer when performing a cost calculation on the basis of pixels spaced at 1 pixel intervals apart from a pixel spaced at a ½ pel interval in the upward direction or downward direction of the 1-pel motion vector, and
  the ½-pel ME uses the third bank of the ½-pel Y buffer when performing a cost calculation on the basis of pixels spaced at 1 pixel intervals apart from a pixel spaced at a ½ pixel interval in the leftward direction or rightward direction of the 1-pel motion vector.

17. The video encoding apparatus of claim 1, wherein the ¼-pel Y buffer comprises:
  a first bank storing pixels spaced at 1 pixel intervals apart from a pixel spaced at a ¼ pel interval in upward and leftward directions of the ½-pel motion vector;
  a second bank storing pixels spaced at 1 pixel intervals apart from a pixel spaced at a ¼ pel interval in an upward direction of the ½-pel motion vector;
  a third bank storing pixels spaced at 1 pixel intervals apart from a pixel spaced at a ¼ pel interval in upward and rightward directions of the ½-pel motion vector;
  a fourth bank storing pixels spaced at 1 pixel intervals apart from a pixel spaced at a ¼ pel interval in a leftward direction of the ½-pel motion vector;
  a fifth bank storing pixels spaced at 1 pixel intervals apart from a pixel spaced at a ¼ pel interval in a rightward direction of the ½-pel motion vector;
  a sixth bank storing pixels spaced at 1 pixel intervals apart from a pixel spaced at a ¼ pel interval in downward and leftward directions of the ½-pel motion vector;
  a seventh bank storing pixels spaced at 1 pixel intervals apart from a pixel spaced at a ¼ pel interval in a downward direction of the ½-pel motion vector; and
  an eighth bank storing pixels spaced at 1 pixel intervals apart from a pixel spaced at a ¼ pel interval in downward and rightward directions of the ½-pel motion vector.

18. The video encoding apparatus of claim 17, wherein the ¼-pel ME uses the first bank of the ¼-pel Y buffer when performing a cost calculation on the basis of pixels spaced at 1 pixel intervals apart from a pixel spaced at a ¼ pel interval in the upward and leftward directions of the ½-pel motion vector, the ¼-pel ME uses the second bank of the ¼-pel Y buffer when performing a cost calculation on the basis of pixels spaced at 1 pixel intervals apart from a pixel spaced at a ¼ pel interval in the upward direction of the ½-pel motion vector, the ¼-pel ME uses the third bank of the ¼-pel Y buffer when performing a cost calculation on the basis of pixels spaced at 1 pixel intervals apart from a pixel spaced at a ¼ pixel interval in the upward and rightward directions of the ½-pel motion vector, the ¼-pel ME uses the fourth bank of the ¼-pel Y buffer when performing a cost calculation on the basis of pixels spaced at 1 pixel intervals apart from a pixel spaced at a ¼ pel interval in the leftward direction of the ½-pel motion vector, the ¼-pel ME uses the fifth bank of the ¼-pel Y buffer when performing a cost calculation on the basis of pixels spaced at 1 pixel intervals apart from a pixel spaced at a ¼ pixel interval in the rightward direction of the ½-pel motion vector, the ¼-pel ME uses the sixth bank of the ¼-pel Y buffer when performing a cost calculation on the basis of pixels spaced at 1 pixel intervals apart from a pixel spaced at a ¼ pixel interval in the downward and leftward directions of the ½-pel motion vector, the ¼-pel ME uses the seventh bank of the ¼-pel Y buffer when performing a cost calculation on the basis of pixels spaced at 1 pixel intervals apart from a pixel spaced at a ¼ pel interval in the downward direction of the ½-pel motion vector, and the ¼-pel ME uses the eighth bank of the ¼-pel Y buffer when performing a cost calculation on the basis of pixels spaced at 1 pixel intervals apart from a pixel spaced at a ¼ pixel interval in the downward and rightward directions of the ½-pel motion vector.

19. A video encoding apparatus comprising:

a current macro block (MB) memory storing and providing previous, current and next MBs of a current frame;

a search window one (SW1) memory storing and providing search window (SW) regions of the previous, current and next MBs for coarse motion estimation;

a search window two (SW2) memory storing and providing adjacent pixels around the SW regions of the previous and current MBs for fine motion estimation;

a coarse motion estimation part (CME) performing coarse motion estimation on the basis of the current MB and the SW region of the current MB;

a fine motion estimation and motion compensation part (FMEMC) performing fine motion estimation and motion compensation on the basis of an output of the CME, the previous MB, the SW region of the previous MB, and the adjacent pixels around the SW region of the previous MB;

an intra prediction & reconstruction part performing intra prediction, quantization, inverse quantization/inverse discrete cosine transformation/inverse hadamard, and reconstruction, by using an output of the FMEMC and information stored in the current MB memory and the SW1 memory;

a frame memory storing a video frame input into the video encoding apparatus; and a frame memory controller (FMC) controlling the current MB memory, the SW1 memory, and the SW2 memory to store data stored in the frame memory, wherein the SW2 memory includes first and second banks separately storing the adjacent pixels around the SW regions of the previous and current MBs, each of the first and second banks in the SW2 memory is divided into first to fourth memory regions, the first memory region storing adjacent pixels located at upper and bottom regions of an SW region of an MB, the second memory region storing adjacent pixels located at left and right regions of the SW region of the MB, and the third and fourth memory regions separately storing words located on even lines among four words of a block of the MB, and each of the third and fourth memory regions is divided into an odd memory region and an even memory region, the odd memory region storing first and third pixels among four pixels located on the same line and the even memory region storing second and fourth pixels thereamong.

* * * * *